(12) United States Patent
Sinkar et al.

(10) Patent No.: US 11,483,208 B2
(45) Date of Patent: Oct. 25, 2022

(54) SYSTEM AND METHOD FOR REDUCING NETWORK TRAFFIC

(71) Applicant: Capital One Services, LLC, McLean, VA (US)

(72) Inventors: Aniket Narasinh Sinkar, McLean, VA (US); Arindam Chakraborty, McLean, VA (US); Jeren Browning, McLean, VA (US); Prabhahar Narayanan, McLean, VA (US); Earl F. Sullivan, McLean, VA (US); Manisha Shrikrishna Purkar, McLean, VA (US); Ryan Quinn, McLean, VA (US); Kevin Scott Rouse, McLean, VA (US); Becky Jean Raschke, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/139,780

(22) Filed: Dec. 31, 2020

(65) Prior Publication Data

US 2022/0210021 A1 Jun. 30, 2022

(51) Int. Cl.
*H04L 41/0896* (2022.01)
*H04L 41/14* (2022.01)
*G06F 40/289* (2020.01)
*G06F 40/30* (2020.01)

(52) U.S. Cl.
CPC ........ *H04L 41/0896* (2013.01); *G06F 40/289* (2020.01); *G06F 40/30* (2020.01); *H04L 41/14* (2013.01)

(58) Field of Classification Search
CPC ... H04L 41/0896; H04L 41/14; G06F 40/289; G06F 40/30
See application file for complete search history.

(56) References Cited

U.S. PATENT DOCUMENTS

| | | | |
|---|---|---|---|
| 2006/0067253 A1 | 3/2006 | Gummalla et al. | |
| 2007/0076856 A1* | 4/2007 | Gummalla | H04W 28/16 379/88.17 |
| 2014/0244714 A1* | 8/2014 | Heiby | H04L 67/26 709/203 |
| 2015/0365524 A1 | 12/2015 | Silver | |
| 2015/0365961 A1 | 12/2015 | Strasman et al. | |
| 2016/0300135 A1* | 10/2016 | Moudy | G06F 40/20 |
| 2017/0013503 A1 | 1/2017 | Lee | |

(Continued)

*Primary Examiner* — Oleg Survillo
*Assistant Examiner* — Monishwar Mohan
(74) *Attorney, Agent, or Firm* — Perkins Coie LLP

(57) ABSTRACT

Some embodiments of the present application include obtaining communications with a user associated with a user account of a service. The communications may be analyzed using natural language processing to detect an instance of a first trigger within the communications. If detected, a data flag can be assigned to a data structure associated with the user account. In some embodiments, subsequent to the data flag being assigned to the data structure, a request may be obtained for a communication to be sent to the user. For instance, the request may be obtained responsive to determining that a value associated with the user account satisfies a condition. Based on the data flag and the request, the communication may be prevented from being sent to the user.

19 Claims, 8 Drawing Sheets

(56) References Cited

U.S. PATENT DOCUMENTS

2019/0052584 A1\* 2/2019 Barve ................... G06Q 10/04
2020/0019946 A1  1/2020 Walker et al.
2020/0074539 A1\* 3/2020 Palaghita ............. G06Q 40/025
2021/0209307 A1\* 7/2021 Serna ...................... H04L 51/22

\* cited by examiner

SYSTEM AND METHOD FOR REDUCING NETWORK TRAFFIC

FIELD

Some embodiments disclosed herein relate to reducing network traffic, including, for example, determining whether to assign a communications suppression flag to a data structure associated with a user account, as well as prevent communications from being sent to user accounts having data structures with communications suppression flags are assigned thereto.

BACKGROUND

Communications networks are inundated with communications between users, services, and the like. This can strain the communications networks and hinder their performance. Exacerbating this problem is the realization that a large subset of the communications are irrelevant or unwanted by users, particularly those communications associated with certain services. Reducing a communications networks' load can improve the networks' performance, decrease latency with which relevant communications are delivered, and increase stability of the networks to degradation/failure.

SUMMARY

In some embodiments, a data stream of communications with a user associated with a user account of a service may be obtained. Using natural language processing, which may include sentiment analysis, any instance of a plurality of triggers in the communications may be detected. If one or more of the triggers are detected in the communications, a data flag, such as a communications suppression flag, may be assigned to the user account. The communications suppression flag may prevent certain communications from being sent to the user associated with the user account. For instance, subsequent to the data flag being assigned to the data structure associated with the user account, it may be detected that a value associated with the user account satisfies a condition. For example, a value of a data field in a data structure associated with the user account may be less than a threshold value. In some embodiments, a request for a communication to be sent to the user may be obtained based on the condition being satisfied. Based on the communications suppression flag being assigned to the data structure associated with the user account and the request, the communication can be prevent from being sent to the user.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific examples are set forth in order to provide a thorough understanding of example embodiments. It will be appreciated, however, by those having skill in the art that embodiments may be practiced without these specific details or with an equivalent arrangement.

Figure 1:
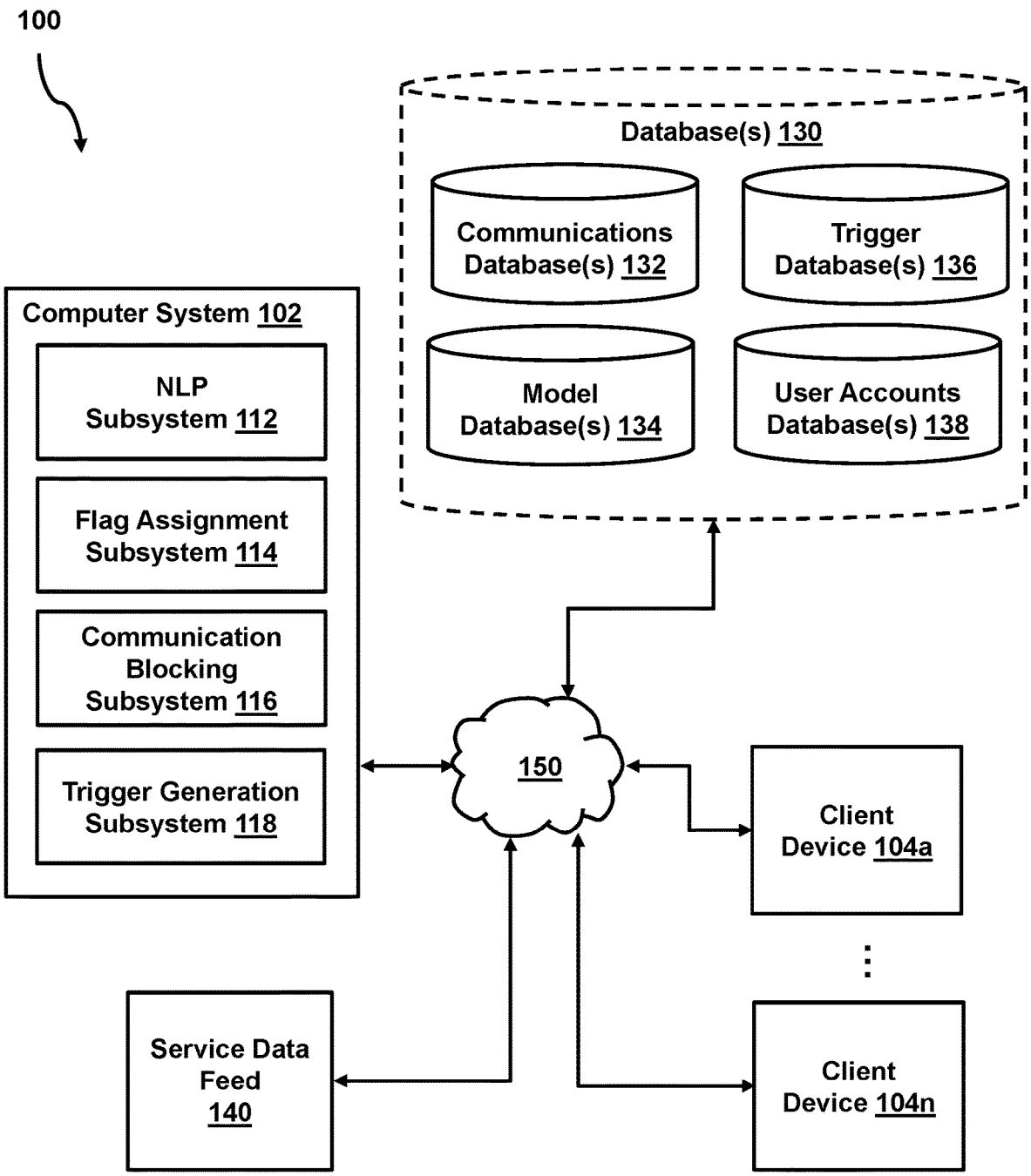
FIG. 1 shows a system for reducing network traffic, in accordance with one or more embodiments.

FIG. 1 shows a system 100 for reducing network traffic, in accordance with one or more embodiments. As shown in FIG. 1, system 100 may include computer system 102, client devices 104a-104n, which collectively may be referred to as "client devices 104" and may individually be referred to as "client device 104," databases 130, service data feed 140, or other components. Computer system 102 may include natural language processing (NLP) subsystem 112, flag assignment subsystem 114, communication blocking subsystem 116, trigger generation subsystem 118, and/or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Communications networks are inundated with communications between users, services, and the like, which can strain and hinder the performance of the communications networks. Many of the communications between services and users are of little-to-no use to users (e.g., spam messages, promotional materials, etc.). Some communications may be prompted by actions by users. For example, communications including an alert may be sent by a service when suspicion activity is detected with respect to an account of the user with the service. As another example, communications including reminders may be sent by a service when an action is not performed by the user (e.g., payment of an outstanding balance). During normal times, such communications, while unfavorable, may not impact a user's perception of a service, as these communications may simply be ignored. However, during times of emotional distress, catastrophe, or other troublesome times, these communications can severely strain the user's opinion of the service, and can further exacerbate negative aspects of the user's emotional state. For example, when dealing with sickness or death, a communication regarding an outstanding credit card debt is not what an individual would want to receive.

Reducing a communications networks' load can improve the networks' performance, decrease latency with which relevant communications are delivered, and increase stability of the networks to degradation/failure. In some embodiments, reducing a communications networks' load may include minimizing a number of communications sent to particular users during particular times. For example, reducing the number of communications sent to a user during troublesome times not only reduces traffic across the communications network, but also garners improved sentiment towards a service that would otherwise send such communications.

Described herein are technical solutions to the above-mentioned technical problems regarding reducing network traffic. In particular, the technical solutions described herein enable communications networks to prevent particular communications from being sent to users so as to reduce the amount of communications transmitted across communications networks. Furthermore, described herein are techniques for identifying when certain communications are to be prevented from being sent to users. For instance, using natural language processing (NLP) performed on communications between a user and a service, a user's state may be determined. In some embodiments, NLP may include sentiment analysis processing, and may include detecting any instances of a sentiment trigger in the communications between the user and the service. If a sentiment trigger is detected, a communication suppression flag may be assigned to a user account, which may cause some or all future communications from the service to the user to be prevented from being sent. In some embodiments, the communication suppression flag may be temporary, and an amount of time with which the communication suppression flag is assigned to the user account may depend on the particular sentiment trigger detected, further inputs from the user to the service, or other factors.

Subsystems 112-118

In some embodiments, NLP subsystem 112 is configured to perform natural language processing to a data stream obtained from service data feed 140 including communications between a user and a service, communications stored in communications database 132, input communications, or to other data. The communications may include text communications, audio communications, video communications, or other communication formats, or combinations thereof. In some embodiments, the communications may be between one or more users, users and a service, users and an agent of a service (e.g., a human agent, an automated agent, etc.), and the like. NLP subsystem 112 may transform the communications into a format processable by other components of system 100, determine an intention of a user associated with the communications, cause an action to be performed based on the communications, or perform other functions.

NLP subsystem 112 may receive communications 202 from a source. In some embodiments, the source may be communications database 132. For instance, communications between a user and a service (e.g., a financial service, a communications service, a medical service, etc.) may be recorded and stored in communications database 132. Upon request or at predefined cadences, the communications may be retrieved from communications database 132 and input to NLP subsystem 112. In some embodiments, the source may be a service data feed, such as service data feed 140. For example, service data feed 140 may receive a continuous flow of updated data from a corresponding real-time application of a service and may output a data stream including the updated data (e.g., the communications) to computer system 102, databases 130, or other components of system 100. A real-time application may generate and output updated application data, which may be received by service data feed 140. The updated application data may include communications between users and a service. For instance, the updated application data may include real-time communications between a user and an agent of a service, such as a financial service, a medical service, and the like. In some embodiments, service data feed 140 may provide a data stream including communications between the user and the service to computer system 102 for analysis, communications database 132 for storage, or to other components of system 100.

Figure 2:
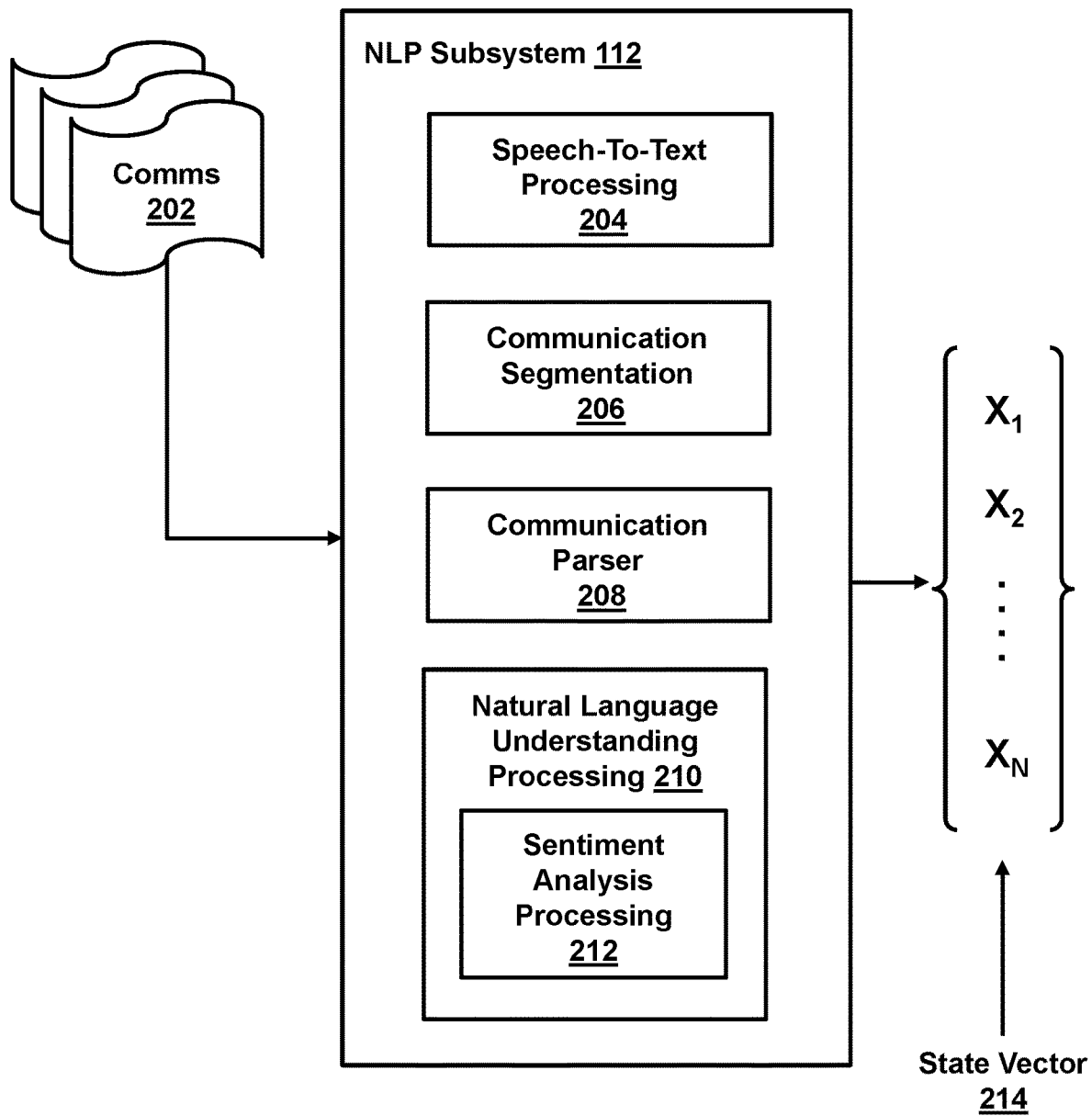
FIG. 2 shows a natural language processing subsystem, in accordance with one or more embodiments.

As an example, with reference to FIG. 2, NLP subsystem 112 may receive communications 202. In some embodiments, the communications may be included in a data stream received from data service feed 140. In some embodiments, the communications may be retrieved from communications database 132, provided via a data stream from service data feed 140, or obtained from another source. The communications may include text data, audio data, video data, or other data. As mentioned above, communications 202 may include communications between users, communications between users and a service, or other communications between other entities. As an example, communications 202 may include one or more messages between a user of a service (e.g., a health service, a financial service, an informational assistance service, etc.) and an agent of the service (e.g., a human representative, a chatbot, etc.). Communications 202 may be a compilation of messages occurring during a specific period of time, a most recent N messages, all messages, or a specific subset of messages (e.g., messages relating to a particular topic). In some embodiments, communications 202 may include spoken utterances, captured as audio data, video data, text data, or a combination thereof.

In some embodiments, NLP subsystem 112 may be configured to perform speech-to-text (STT) processing 204 to some or all of the utterances included within each of communications 202. STT processing refers to a process whereby one or more speech models are used to identify words or phrases within an utterance. In particular, STT processing 204 may be used to transform audio data representing an utterance to text data representing that audio data. Furthermore, the text data may be organized or generated in an organized format such that it can be understood by a computer system. In some embodiments, STT processing 204 may implement keyword spotting technology to evaluate audio signals in order to detect the presence of a predefined keyword or phrase, or other sound data, within an audio signal. In some embodiments, keyword spotting technology may output a true/false (e.g., logical I/O) signal indicating whether a particular word or phrase was uttered by the user. A score indicating a likelihood that the audio signal included the particular word or phrase may be produced and compared to a threshold value to determine whether that word or phrase can be declared as having been uttered. In some embodiments, STT processing 204 may access one or more speech models stored by model database 134, which may be used to compare a sound or sequence of sounds (e.g., one or more phonemes) with known sounds to identify matching words within the audio signals. The identified words may then be used to generate a text string representing a textual depiction of the spoken utterance. In some embodiments, the text representation of communications 202 (e.g., after having STT processing 204 performed to communications 202), is referred to herein as text communications.

In some embodiments, communications 202 may be in the form of text data when provided to NLP subsystem 112. When some or all of communications 202 do not include audio, then STT processing 204 may not be needed for those communications. In some cases, STT processing 204 may be performed locally, such as by client device 104, or may be performed by service data feed 140. Communications 202 may be stored in communications database 132 in their text format.

In some embodiments, NLP subsystem 112 includes communication segmentation 206. Communication segmentation 206 may be configured to segment the text communications into individual communications. For example, if communications 202 includes 10 communications, communication segmentation 206 can split communications 202 into the 10 individual text communications. Some embodiments include communication segmentation 206 being performed prior to STT processing 204. In such cases, communication segmentation 206 may segment communications 202 into individual communications, and subsequently each communication may be transformed into text data via STT processing 204.

In some embodiments, each individual text communication may include metadata indicating that communication's temporal position with respect to the other communications. For example, communication segmentation 206 may temporally arrange each of communications 202 and attribute temporal metadata to each of communications 202 such that NLP subsystem 112 is able to identify which communication occurred first, temporally, and which communication occurred most recently. In some cases, where communications 202 includes only a single communication, communication segmentation 206 may not be needed.

Each text communication may be input to communication parser 208, which may be configured to parse that text communication's utterances. In some embodiments, communication parser 208 extracts the utterances from the text communication and organizes the utterances into an ordered list of utterances, which can also be referred to as a sequence of utterance. The ordered list may indicate which utterance was temporally first, second, and so on. The ordered list may also include contextual information related to the corresponding text utterance. For example, if communications 202 are between a user of a service and an agent of the service, some utterances may be from the user, whereas other may be from the agent. Communication parser 208 may be configured to track or determine the utterances' producers as the communication progresses and generate the ordered list of utterances with the contextual information.

NLP subsystem 112 may also include natural language understanding (NLU) processing 210. NLU processing 210 may operate in conjunction with STT processing 204 to understand what a given utterance (e.g., an utterance included within communications 202) means and, if applicable, associate the utterance with an action or actions to be performed by a computing device (e.g., causing a light to turn on). NLU processing 210 aims to determine an intent of an utterance based on the words and phrases included within the utterance. NLU processing 210 may determine a category that an utterance's intent relates to, such as whether the utterance is directed to music, finance, sports, and the like, and based on the identified category and the text data representing the utterance, resolve each word or phrase to a known word or phrase. In this way, each portion of the utterance may be attributed with a meaning understandable by computer system 102. In some embodiments, NLU processing 210 may be customized for a given user, for a given set of users, and/or based on contextual features.

In some embodiments, NLU processing 210 may include sentiment analysis processing 212. Sentiment analysis refers to a process for determining a sentiment of a user based on input data (e.g., text, image, video, etc.). One goal of sentiment analysis is to estimate an emotion or emotional state of a user. For example, based on communications 202, sentiment analysis processing 212 may estimate whether the user of communications 202 is happy, sad, angry, or other emotional state. In some embodiments, sentiment analysis processing 212 uses the text data and contextual information of each of communications 202 to determine the emotional state of the user.

To determine an emotional state of a user from the text communications, sentiment analysis processing 212 may be configured to classify each utterance of each text communication as being one of a set of possible polarities, such as positive, negative, or neutral. A total polarity of each text communication can be determined based on the polarity of each individual utterance. For example, a polarity score for each utterance may be computed by sentiment analysis processing 212, and a combination of the polarity scores for the utterances included in each text communication may be calculated to determine a polarity score of each text communication. The polarity score of each text communication can then be combined to determine an overall polarity of the user. Alternative combination techniques of the utterances of the text communications may also be employed (e.g., analyzing a set of utterances, a set of text communications, or performing a different combinations). Sentiment analysis processing 212 may employ one or more sentiment analysis models, which can be stored in model database 134. While some of these sentiment analysis models are configured to classify utterances as being positive, negative, or neutral, other sentiment analysis models may be configured to estimate emotions. Furthermore, some sentiment analysis models may be configured to classify an utterance into more specific polarity classes, such as very positive, positive, neutral, negative, or very negative. In some embodiments, each polarity class may have a corresponding polarity score, which may be attributed to a given utterance classified into one of those classes. In some embodiments, sentiment analysis processing 212 may generate a polarity vector. The polarity vector may include n-attributes, where n corresponds to a number of classes of polarities into which a given sentiment analysis model is configured to classify an utterance. A value assigned to each attribute may represent a likelihood that the given utterance refers to each particular attribute's corresponding polarity. For example, a polarity vector having the values {1, 0, 0} may indicate that sentiment analysis processing 212 classified a given utterance as being 100% of a first polarity, 0% of a second polarity, and 0% of a third polarity, where the first, second, and third polarity refer to "positive," "negative," and "neutral," respectively.

The sentiment analysis models may be configured to analyze different texts and detect certain words or phrases that are classified as being related to particular polarities, emotional states, expressions, and the like. The words or phrases may be referred to as "triggers," "sentiment triggers," or "sentiment keyword triggers," herein interchangeably. The triggers may be stored in trigger database 136, which is described in greater detail below with respect to FIG. 4. In some embodiments, the sentiment analysis model may be a Hidden Markov Model (HMM), a convolutional neural network (CNN), a recurrent neural network (RNN), a deep neural network (DNN), a transformer model, or other machine learning model. The words or phrases classified as being triggers may be predetermined by a model creator, learned by the given model used to perform the sentiment analysis, learned using alternative or additional models (e.g., Word2Vec models), or via other techniques. In some embodiments, sentiment analysis processing 212 may generate or update a vector including a plurality of attributes that each correspond to one of the triggers stored by trigger database 136. When a particular trigger is detected, sentiment analysis processing 212 notes the detection by adjusting a value associated with that attribute to indicate a likelihood that the sentiment analysis model detected the presence of that trigger within the analyzed utterance. Some embodiments include sentiment analysis processing 212 outputting an indicator that indicates whether a trigger was detected within an utterance, where the indicator also reflects which trigger was detected. For example, the indicator may be a trigger identifier corresponding to the detected trigger.

Each trigger may be associated with a particular polarity, emotion, or other descriptor capable of being used to represent a sentiment of an utterance. For example, a first set of triggers stored within trigger database 136 are associated with a first polarity state (e.g., "positive"), a second set of triggers stored within trigger database 136 are associated with a second polarity state (e.g., "negative"), and a third set of triggers stored within trigger database 136 are associated with a third polarity state (e.g., "neutral"). Therefore, depending on the number of instances of each trigger detected within a given utterance, sentiment analysis processing 212 may output a vector including attributes corresponding to each polarity, where each attribute includes a value reflecting a likelihood of that utterance corresponding to each polarity. For example, a vector with attribute values 1, 0, 0 may indicate that an input utterance is 100% likely to be related to a positive polarity, and 0% related to a negative or neutral polarity.

It should be noted that the sentiment analysis models may be trained to detect sarcasm or other contextual irregularities. For example, taken without context, the utterance, "Oh, great" may be classified as having a "positive" polarity due to the presence of the word "great," which may be a trigger associated with positive polarity. However, the context of the communication with which the utterance is included may indicate that the word "great" is an irregular usage of the word, such as with sarcasm, and therefore a different polarity (e.g., "negative" polarity) may be identified for the utterance.

In some embodiments, sentiment analysis processing 212 may additionally or alternatively use image data, video data, or both, to determine an emotional state of the user from communications 202. In these cases, sentiment analysis processing 212 may further include facial recognition processing, facial expression recognition processing, gesture recognition processing, or other techniques. Facial recognition processing includes determining an identity of an individual based on an image or images depicting that individual. Facial expression recognition processing includes determining a facial expression exhibited by an individual based on an image or images of the individual. Gesture recognition processing includes determining a gesture exhibited by a human within an image or images. The gestures may be performed by different human body parts (e.g., hands, arms, head, etc.). Each facial expression and gesture may be associated with a different polarity (e.g., "positive," "negative," "neutral"), and detection of one or more of those facial expressions and/or gestures may indicate that a user is expressing a particular emotion. When taken alone or in conjunction with an utterance, the facial expression and/or gesture may be used to characterize an emotional state of a user. For example, detection of facial expressions relating to sadness (e.g., "crying") or anger may reflect that the user is experiencing a particular emotional state. In some embodiments, the utterance may include periods of time where no words are spoken and only facial expressions or gestures are detected. By being able to detect an emotional state of a user, or detecting a change in an emotional state of a user, during those periods of time may improve the quality of emotional recognition by sentiment analysis processing 212, and can improve the ways in which computer system 102 facilitates interactions with a user based on the detected emotional states. In some embodiments, sentiment analysis processing 212 may weight trigger word detection, facial expression recognition, gesture detection, or other techniques when resolving an emotion of a user for a given communication or set of communications. For example, trigger word detection may have a higher weight than other detection mechanisms if the communications to be analyzed do not include images or videos of the corresponding user. As another example, facial expression recognition may receive an increased weight for communications including video. Still further, a given communication may have a variable weighting scheme whereby different emotion detection mechanisms receive different weights throughout the duration of the communication (e.g., a communication including video where there is a portion of silence may receive a weight boost for facial expression recognition during that portion of time, down-weight sentiment trigger analysis, and the like).

Facial recognition functionality enables a computer system, such as computer system 102, to detect human faces within an image. In some embodiments, a given image may be transformed into a histogram of orientated gradients (HOG) image to determine whether the given image includes a human face pattern. Alternatively or additionally, facial landmark estimation may be used to determine whether a given image includes a human face pattern. Upon detecting that an image includes a human face, facial recognition functionality may attempt to determine whether the human face corresponds to a known human face. In some embodiments, a deep CNN may be trained using a set of training images. The CNN may learn how to generate embeddings for each image representative of the faces included within the set of training images. For example, the embeddings may include a feature vector representing features extracted by the CNN of the image. Upon capturing image data representing an image of a user, the CNN may extract features from the image data and compare the features to the known features from the training data set. A distance metric, such as a cosine distance, a Euclidean distance, or a Hamming distance, may be computed between the feature vector representing the features extracted from the image and the feature vectors associated with images from the training data set. The distance metric may indicate how similar the captured image is to an image from the training data set. In some embodiments, if the distance metric between the captured image and one of the images from the training data set satisfies a predefined threshold condition, such as the distance being less than or equal to a threshold value (e.g., less than or equal to 0.2, 0.1, 0.01, etc.), then the captured image may be classified as depicting a same human face as that of the image from the training data set.

Facial expression recognition corresponds to an ability to classify a face as depicting a particular emotion. Examples of the different types of emotions that a human face may express include, but are not limited to, anger, fear, happiness, sadness, surprise, confusion, or a neutral expression. In some embodiments, the facial expression recognition functionality may work in conjunction with the facial recognition functionality. For instance, to perform both facial expression recognition and facial recognition, a human face will need to be detected within an image and facial features will need to be extracted from the image. Therefore, some or all of the same features extracted during facial recognition processing may be used for facial expression recognition processing.

Similar to facial recognition, training data including a large number of images depicting human faces expressing different expressions may be obtained and used to train a CNN for recognizing facial expressions of human faces. In some embodiments, features may be extracted from the images to tune and train the weights and biases of the images. For example, the VGG-16 CNN may be used to extract features and output feature vectors of training images, such as images obtained from the ImageNet dataset. In some embodiments, a classifier (e.g., a classification model) may be trained to recognize particular facial expressions (e.g., anger, happiness, sadness, etc.). The output from the classifier may be a vector including probabilities indicating a likelihood that a given image of a human face is depicting a particular expression. For example, if the categories include anger, fear, happiness, sadness, surprise, confusion, and neutral expressions, then the output vector may include seven probabilities, each in a range between 0 and 1.0 indicative of the likelihood that a human face depicted within an input image is expressing one of the aforementioned emotions.

Gesture recognition differs from facial expression recognition in that gesture recognition may include an analysis of more than just a human face, such as a face, torso, arms, legs, etc. Gesture recognition may also include determining a pose of the human depicted in an image. In some embodiments, gesture recognition functionality may employ a three-dimensional (3D) CNN for analyzing captured video. The 3D CNN may extract features, similar to that described above with regards to facial recognition and facial expressions recognition. However, the 3D CNN may also, in some embodiments, extract spatial-temporal features (e.g., feature changes in space over time). In some embodiments, one or more recurrent neural networks (RNN), which may be obtained from model database 134, may be placed downstream from the 3D CNN to model temporal relationships between features, and a classifier, such as a Softmax function, to generate a vector including probabilities that a human depicted by a given video is performing a particular gesture. The various types of gestures that may be detected via the classifier include, but are not limited to, hand waves (a hand or hands moving right or left), other hand movements (e.g., thumbs up, thumbs down, etc.), arm movements, head movements, and the like.

Sentiment analysis processing 212 may take each emotion detection mechanism's output vector, and may combine those outputs to produce a state vector 214 that reflects a state of the user within communications 202. State vector 214 includes N-attributes having values $X_1, X_2, \ldots, X_N$. Each value represents a likelihood that a user included within communications 202 is in one of N different states. The states may reflect an emotional state of a user. For example, a user may be happy, sad, angry, etc. After analyzing communications 202, sentiment analysis processing 212 may generate or update state vector 214 such that values $X_1, X_2, \ldots, X_N$ reflect how likely a user is in one (or more) of the various emotional states. Sentiment analysis processing 212 may combine the various emotion detection mechanisms used to analyze communications 202 (e.g., trigger detection, facial expression recognition, etc.) and determine, based on the outputs of the emotion detection mechanisms, each of values $X_1, X_2, \ldots, X_N$. For example, sentiment analysis processing 212 may combine a first vector $V_1$, computed based on trigger detection performed to communications 202, with a second vector $V_2$, computed based on facial expression recognition performed to communications 202, to determine state vector 214.

After computing state vector 214, a determination of what actions, if any, are to be performed to a user account associated with the user from communications 202 may occur. In some embodiments, the actions may include freezing the user account such that no changes can occur, blocking the user account such that the user account is not able to be used to interact with computer system 102, client devices 104, or other components of system 100, assigning a communication suppression flag to the user account such that some or all communications from a service to the user are prevented, or other actions. In some embodiments, one or more indicators representing which actions are to be performed may be generated by flag assignment subsystem 114 based on the output of NLP subsystem 112 (e.g., state vector 214).

Figure 3:
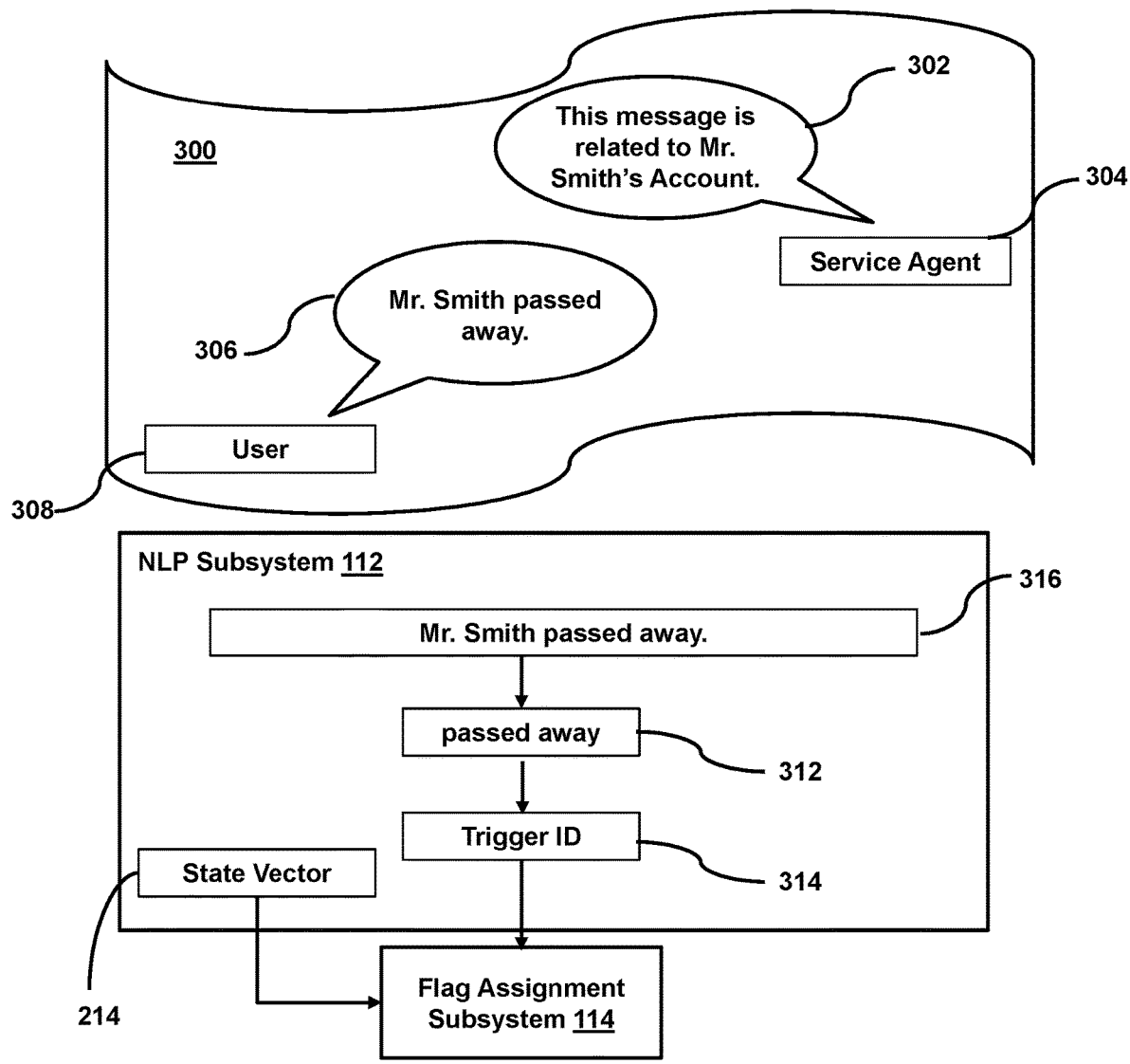
FIG. 3 shows a diagram for determining that a data flag is to be assigned to a data structure associated with a user account, in accordance with one or more embodiments.

As an example, with reference to FIG. 3, NLP subsystem 112 may receive communications 300, which include a first utterance 302 and a second utterance 306. First utterance 302 may be from a service agent 304, such as an agent of a service associated with service data feed 140. Second utterance 306 may be from a user 308 of the service. For example, user 308 may be a user of a financial service, and user 308 may contact the financial service via chatbot, telephone, email, etc., and communicate with service agent 304.

As mentioned above, communication 300 may be retrieved from communications database 132 and analyzed using one or more components of computer system 102. For example, communication 300 may be analyzed using NLP subsystem 112. In some embodiments, the various utterances included in communication 300 may be separated into those utterances produced by service agent 304 and those utterances produced by user 308. NLP subsystem 112 may analyze the utterances produced by user 308 to determine a state of user 308. In some cases, the utterances produced by service agent 304 may also be analyzed to determine the state of user 308; however, for simplicity, the foregoing description relates to analyzing only the utterances produced by user 308.

In some embodiments, NLP subsystem 112 may extract text data 316 representing utterance 306 by implementing STT processing 204. In the illustrated embodiment, communication 300 includes only a single utterance, and therefore additional segmentation and parsing may not be needed. NLP subsystem 112 may perform NLU processing 210, including sentiment analysis processing 212, to text data 316 to determine whether text data 316 includes an instance of one or more triggers stored in trigger database 136. In some embodiments, sentiment analysis processing 212 may apply a moving window to analyze different words in text data 316 to detect instances of a trigger. For example, sentiment analysis processing 212 may employ a CNN to analyze text strings within text data 316 to determine whether any triggers are present. A moving window of a finite character length and step may pass over the text strings and perform a binary analysis of whether any triggers are present within those text strings under consideration. For example, the window may be 3 or more characters long, 5 or more characters long, or more, and may have a step of 2 or more characters, 4 or more characters, or others.

If the characters within the window represent one of the triggers stored within trigger database 136, then NLP subsystem 112 may generate and output a trigger identifier corresponding to the detected trigger. In some embodiments, flag assignment subsystem 114 may obtain both state vector 214 as well as the trigger identifier associated with detected trigger. For example, NLP subsystem 112 may detect the presence of a trigger 312 (e.g., the phrase "passed away"). In response to detecting the presence of trigger 312, NLP subsystem 112 may output trigger ID 314 corresponding to the detected trigger 312. Both trigger ID 314 and start vector 214 may be provided to flag assignment subsystem 114 to determine whether a metadata flag is to be assigned to a user account associated with user 308, or whether any additional or alternative actions are to be performed by computer system 102.

In some embodiments, additional contextual information may be obtained by NLP subsystem 112 and provided to flag assignment subsystem 114. For example, NLP subsystem 112 may determine, using NLU processing 210, an intent of utterance 306. While sentiment analysis processing 212 may identify a state of user 308, the context of what user 308 uttered, whether via voice or text, may be used to determine what actions, if any, should be performed by computer system 102. In some cases, utterance 302 produced by service agent 304 may be analyzed and leveraged to determine the context of utterance 306 from user 308. For instance, NLU processing 210 of NLP subsystem 112 may determine that an intent of first utterance 302 is to communicate with an individual associated with account of a particular user (e.g., "Mr. Smith"). Based on this information, and text data 316, NLU processing 210 may determine that user 308 is indicating that the account holder of a particular user account has died. If user 308 is the partner of the account holder, which can be derived from communication 300 based on the mechanism with which user 308 was contacted by service agent 304, then this can reflect that user 308 is experiencing sadness or grief due to human loss. Therefore, additional communications to user 308 regarding the account of Mr. Smith, in this example, may provide exacerbated negative emotions to user 308, and thus should be avoided. Not only can this avoid applying extra pressure to user 308, but it can also increase sentiment towards the service associated with service agent 304 by decreasing negative perception for the service.

Returning to FIG. 1, flag assignment subsystem 114 may be configured to determine whether to assign a metadata flag to a user account associated with a user based on a state vector, trigger ID, or other data, generated by NLP subsystem 112. In some embodiments, flag assignment subsystem 114 may determine, based on the input data (e.g., state vector, trigger ID, etc.), that communications from a service to a user associated with a particular user account are to be suppressed. For instance, if NLP subsystem 112 determines that a user is in a particular emotional state, detects the presence of a particular trigger, recognizes a particular facial expression or gesture, or a combination thereof, this may indicate that communications from the service to the user should be suppressed. Some examples of situations whereby communications should be suppressed include death or illness to an account holder, a family member associated with an account holder, employment loss, or other scenarios. Furthermore, different situations may have different durations with which communications are to be suppressed.

Figure 4:
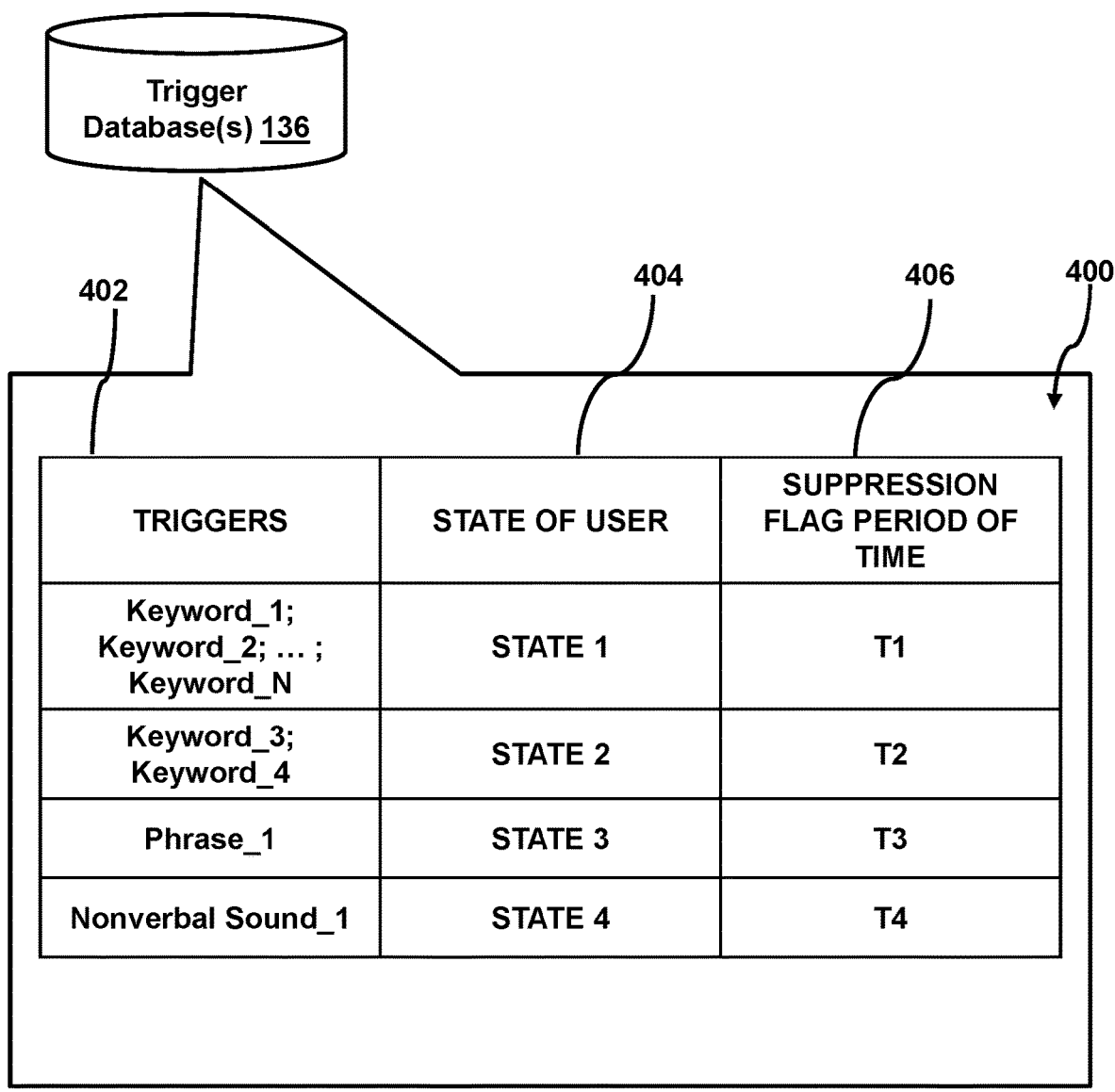
FIG. 4 shows a data structure of sentiment triggers stored in a trigger database, in accordance with one or more embodiments.

As an example, with reference to FIG. 4, trigger database 136 includes a table 400 of different triggers that can be detected within a particular utterance, different states that a user can be determined to be in, and periods of time with which a communication suppression flag is to be applied to a user account based on the detected trigger, the determined state, or a combination thereof. Table 400 includes a list 402 of different triggers that, if detected within one or more utterances, may cause a communications suppression flag to be assigned to a user account. Table 400 also includes a list 404 of different states of a user that, if determined, can cause a communications suppression flag to be assigned to a user account. Table 400 additionally includes a list 406 of various periods of time with which a communication suppression flag is to be assigned to a user account based on a corresponding trigger, state, or both, detected.

Each of the triggers and states includes in lists 402 and 404, respectively, may have a corresponding period of time with which a communications suppression flag is to be applied to a user account. For example, if keyword_1 is detected within an utterance of a communication between a user and a service, then flag assignment subsystem 114 may assign a communication suppression flag to a user account with the service for a period of time T1 (where the user account is associated with the user). Similarly, if a state of the user, determined based on an analysis of the communications between the user and the service, is determined to be "State 1" (e.g., "sad"), then flag assignment subsystem 114 may also assign a communication suppression flag to the user account with the service for the period of time T1. The communication suppression flag may be temporarily assigned to the user account (e.g., for periods of time T1, T2, T3, T4), however, alternatively, the period of time with which the communication suppression flag is assigned may not be associated with any defined period of time. For example, the communication suppression flag may be assigned to the user account and remains assigned until flag assignment subsystem 114 determines that the communication suppression flag is to no longer be assigned to the user account. In such cases, flag assignment subsystem 114 may remove the communication suppression flag from being assigned to the user account.

In some embodiments, detection of a particular trigger or determination of the user being in a particular state, alone, may not cause flag assignment subsystem 114 to assign the communication suppression flag to the user account for a corresponding period of time. Some embodiments include flag assignment subsystem 114 determining that the user is both in a particular state and that a particular trigger has been detected. For example, consider a scenario where NLP subsystem 112 generates, based on an analysis of communications 202, state vector 214 indicating a particular state of the user, such as "State 1" (e.g., "sad"). If NLP subsystem 112 also detected an instance of keyword_1, then upon receipt of state vector 214 and the trigger ID associated with keyword_1 (e.g., "death" or "illness"), flag assignment subsystem 114 may assign a communication suppression flag to the user's account. However, if none of the triggers are detected, flag assignment subsystem 114 may not assign the communication suppression flag to the user's account.

In some embodiments, flag assignment subsystem 114 may be configured to determine a state of the user based on the state vector output by NLP subsystem 112. As mentioned previously, state vector 214 includes values $X_1, X_2, \ldots, X_N$, each of which corresponds to a likelihood that the user is in one of N different states. Not all of values $X_1, X_2, \ldots, X_N$ may be equal to zero and, in many cases, most of values $X_1, X_2, \ldots, X_N$ are non-zero. For example, state vector 214 may include normalized values such that values $X_1, X_2, \ldots, X_N$ are numbers between 0.0 and 1.0. Some embodiments may include flag assignment subsystem 114 determining the state of the user based on values $X_1, X_2, \ldots, X_N$. For example, the particular values for each of values $X_1, X_2, \ldots, X_N$ may be mapped to a particular state of the user. Table 1 describes one example for such a mapping; however, other mappings may be used or learned based on training and additional use cases. Furthermore, for simplicity, Table 1 only uses two values, $X_1$ and $X_2$, for mapping to a particular state.

TABLE 1

| Value $X_1$ | Value $X_2$ | State |
|---|---|---|
| 0.70-1.00 | 0.00-0.19 | Happy |
| 0.50-0.69 | 0.20-0.49 | Sad |
| 0.20-0.49 | 0.50-0.69 | Angry |
| 0.00-0.19 | 0.70-1.00 | Surprised |

In the example of Table 1, if value $X_1$ is between 0.70 and 1.00, and value $X_2$ is between 0.00 and 0.19, then this indicates that the user state is "Happy" (e.g., the user's emotion is estimated as being happy).

Figure 5:
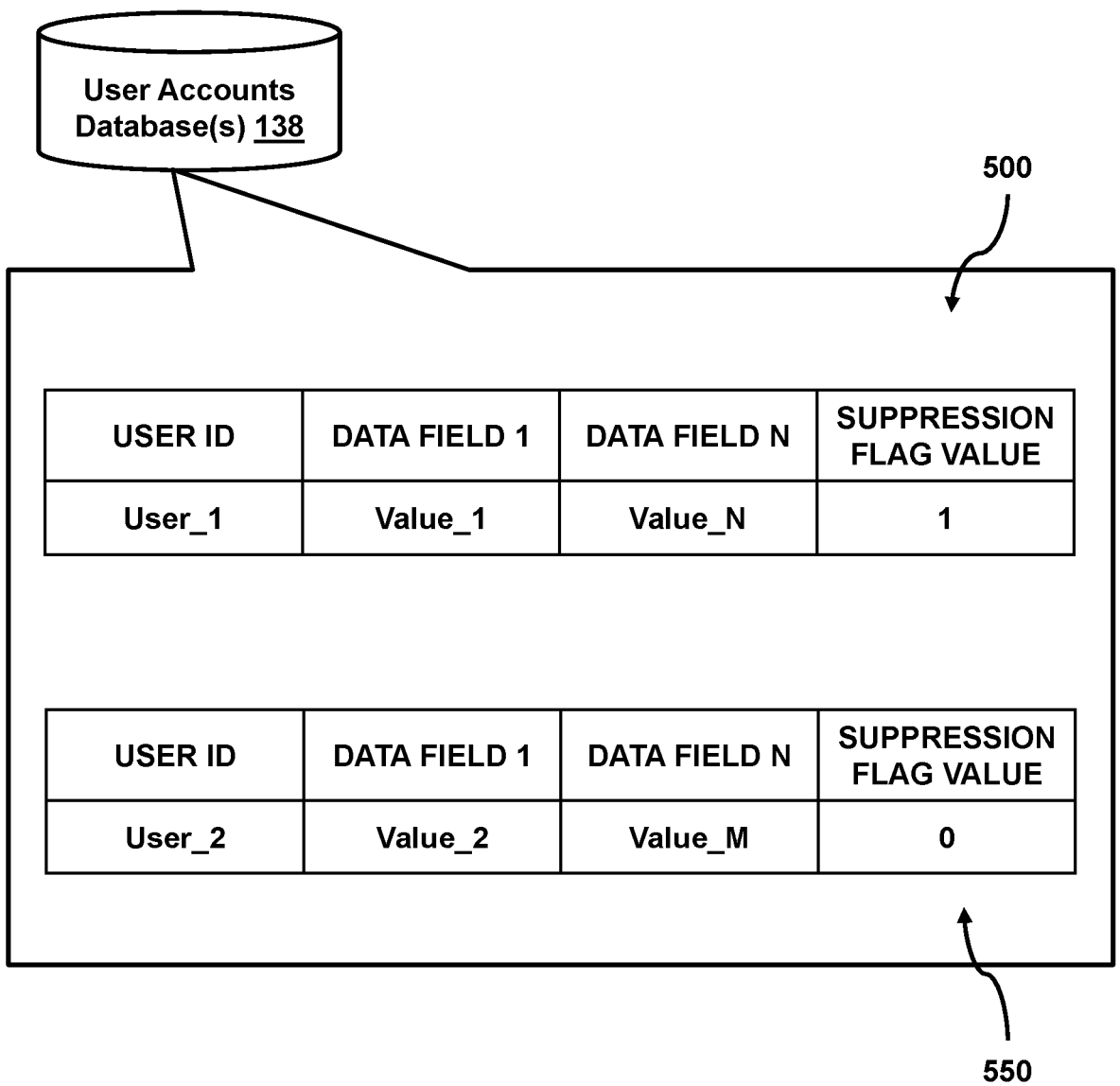
FIG. 5 shows data structures stored in a user account database, in accordance with one or more embodiments.

In some embodiments, flag assignment subsystem 114 may be configured to assign a metadata flag, such as a communication suppression flag, to a data structure associated with a user account based on the detection of a particular trigger, detection of a particular state of the user, a combination thereof, or other determined characteristics of the user. For example, detection of a particular keyword (e.g., "death") within communications between a user and a service with which the user has a user account with, may cause flag assignment subsystem 114 to assign a communication suppression flag to that user account. In some embodiments, assigning a metadata flag, such as a communication suppression flag, may represent updating a value of a data field in a data structure associated with a user account, appending a metadata flag to the data structure, creating a new data field in the data structure having a particular value assigned thereto, or other actions. As an example, with reference to FIG. 5, user accounts database 138 may include a first data structure 500 associated with a first user account and a second data structure 550 associated with a second user account. Each of data structures 500 and 550 include multiple data fields including a User ID data field and a suppression flag value data field. First data structure 500 is associated with a user account for "User_1" whereas second data structure 550 is associated with a user account for "User_2". Other data fields may include balances associated with each user account, benefits associated with each user account, access control rights for each user account, groups/memberships for each user account, and the like.

In some embodiments, each of data structures 500 and 550 include a data field for the communication suppression flag. In some cases, a value of the data field for the communication suppression flag is indicative of whether the communication suppression flag has been assigned to the corresponding user account. For example, data structure 500 includes a value "1" for the data field for communication suppression flag. The value of "1" may indicate that the user account with which data structure 500 is associated has had the communication suppression flag assigned thereto. As another example, data structure 550 includes a value "0" for the data field for communication suppression flag. The value of "0" may indicate that the user account with which data structure 550 is associated has not had the communication suppression flag assigned thereto, or that the communication suppression flag is not currently assigned to the corresponding user account. Alternatively, different values may be used to indicate that a user account has or does not have a communication suppression flag assigned to it, and the aforementioned is merely illustrative.

When the communication suppression flag is to be assigned to a particular user account, flag assignment subsystem 114 may be configured to modify a value of the data field for the communication suppression flag in the user account's data structure from one value to another. For example, flag assignment subsystem 114 may update a value of the data field for the communication suppression flag from being "0," indicating that communications from the service to the user associated with the user account are permitted, to be "1," indicating that communications from the service to the user associated with the user account are to be prevented. In some embodiments, flag assignment subsystem 114 may perform an operation, such as a compare-and-swap (CAS) operation, to assign the communication suppression flag to the data structure associated with the user account. Furthermore, flag assignment subsystem 114 may be configured to perform another operation, which may be another CAS operation, to remove the communication suppression flag from being assigned to the data structure associated with the user account.

In some embodiments, flag assignment subsystem 114 may further be configured to update a data structure associated with a user account such that a data field is added to the data structure, and a value is assigned to that data field. For example, data structure 500 may not initially include a data field for the communication suppression flag. Subsequent to the communication suppression flag being assigned to data structure 500, flag assignment subsystem 114 may add a new data field for the communication suppression flag to data structure 500 and may populate a value to the data field (e.g., a value "1").

As mentioned above, the communication suppression flag may be assigned for certain periods of time, depending on the state of the user, the trigger detected, or for other reasons. For example, a user determined to be in "State 1" and where the trigger "Keyword_1" is detected within communications of that user with a service may have the communication suppression flag assigned to the data structure associated with the user's account for a period of time T1. In some embodiments, flag assignment subsystem 114 may include a timer or timing mechanism configured to track an amount of time that has transpired since a data structure has been assigned a communication suppression flag (or another metadata flag). If flag assignment subsystem 114 determines that the amount of time is equal to or less than a threshold amount of time, corresponding to the period of time with which the communication suppression flag is to be applied, then flag assignment subsystem 114 may perform an operation to update the value assigned to the data field for communication suppression flags. For example, after a period of time T1 has elapsed, flag assignment subsystem 114 may update the value of the communication suppression flag data field from being "1" to being "0," indicating that communications to the user from the service are no longer to be prevented.

In some embodiments, after the period of time has elapsed (e.g., the period of time when the communication suppression flag is assigned to the user account), flag assignment subsystem 114 may be configured to determine whether the communication suppression flag should continue to be assigned to the user account. To determine whether to communication suppression flag should continue to be assigned to the user account, flag assignment subsystem 114 may determine an initial reasoning for the communication suppression flag being assigned to the user account. For example, if the communication suppression flag was assigned to a user account because the corresponding user was determined to be in the hospital, at the end of the period of time, flag assignment subsystem 114 may generate a request for the user to determine whether the user is still in the hospital. In some embodiments, generating the request may include sending a message (e.g., text, email, postal mail) to the user, or a family member of the user, to obtain additional information regarding a status of the user. In some embodiments, computer system 102 may retrieve information regarding a user associated with the user account from one or more third party source (e.g., credit card companies, medical facilities, government agencies, social media networks, etc.). If it is determined that, based on a current state of the user, that the communication suppression flag should still be assigned to the user account, then flag assignment subsystem 114 may not remove the communication suppression flag from being assigned. Some embodiments include removing the communication suppression flag at the end of a period of time with which the communication suppression flag is to be assigned to a user account and sending a communication from the service to the user. The communication may then be analyzed to determine a user state and how similar the current user state is to the user state when the communication suppression flag was initially assigned to the user account. If the current user state and previous user state are similar to one another (e.g., a distance in vector state between a current state vector and a previous state vector is less than a threshold distance), then flag assignment subsystem 114 may re-assign the communication suppression flag to the user account. During a time period between when the communication suppression flag is removed from assignment to the user account and when the subsequent communication is sent to the user and then analyzed by computer system 102, an additional communication suppression flag may be assigned that, instead of preventing communications from being sent to the user, allows certain communications to be sent to the user or holds all communications from the service to the user in a repository. This can allow time to determine whether or not the communication suppression flag should remain assigned to the user account. In some embodiments, depending on the current state of the user, the communication suppression flag can remain in assignment but with a new period of time, or a new communication suppression flag with a different period of time may be assigned to the user account.

Returning again to FIG. 1, computer system 102 may include communication blocking subsystem 116. In some embodiments, communication blocking subsystem is configured to prevent communications from being sent from a service to a user associated with a user account if a communication suppression flag is or has been assigned to a data structure associated with the user account. Communication blocking subsystem 116 may receive a request from a service, such as service data feed 140, to send a communication or allow a communication to be sent to a user associated with a user account of the service. In some embodiments, the request may include information indicating contents of the communication, the user account with which the communication is to be sent, a condition associated with the user account to be checked, or other information.

Communication blocking subsystem 116, in response to receiving the request, may access the requested user account from user accounts database 138. Upon accessing user accounts database 138, communication blocking subsystem 116 may extract, view, or otherwise determine a value stored in a data field for the communication suppression flag. The value, or a representation thereof, may be returned to communication blocking subsystem 116 to determine whether the value is equal to a particular value indicating that the communication suppression flag is currently assigned to the data structure associated with the user account. If so, communication blocking subsystem 116 may prevent the communication from being sent to the user, or may generate a response to the request indicating that the communication is not to be generated or not to be sent to the user account. However, if the value of the data field for the communication suppression flag indicates that it is not assigned to the user account, then communication blocking subsystem 116 may allow the communication to be sent to the user.

In some embodiments, communication blocking subsystem 116 may be configured to extract a value associated with a particular data field stored by the accessed data structure, and may determine whether that value satisfies a condition. The condition may include the value being less than a threshold value, greater than a threshold value, or other conditions. For example, communication blocking subsystem 116 may extract a value of a current balance of the user account with the service, and may determine whether the value is less than a threshold balance. As another example, communication blocking subsystem 116 may extract a current amount due value from a corresponding data field in the data structure, and may determine whether the value is greater than or equal to a threshold value. In some embodiments, the condition may include the value being less than the threshold value, greater than the threshold value, or the like for greater than or equal to a threshold amount of time. For example, communication blocking subsystem 116 may extract the current amount due value from a corresponding data field in the data structure, determine whether the value is greater than or equal to the threshold value, and determine whether the current amount due value has been greater than or equal to the threshold value for greater than a threshold amount of time. For example, the amount due value may be greater than a certain monetary value for more than three months.

If communication blocking subsystem 116 determines that the condition is satisfied, then a communication to notify the user of the detected condition is expected to be sent to the user. However, based on the determined state of the user, sending such a communication to the user may decrease user satisfaction with the service, increase additional communications across network 150, cause strife to the user, and cause other issues to occur. Therefore, preventing those communications improves the performance of computer system 102, decreases network traffic, and does not cause user dissatisfaction with the service. Communication blocking subsystem 116 determines, based on the condition being satisfied and the communication suppression flag being assigned to the user account, that the communication should be prevented from being sent to the user. In response, communication blocking subsystem 116 may block or otherwise prevent the communication from being sent to the user.

In some embodiments, trigger generation subsystem 118 is configured to generate triggers, such as sentiment triggers that, if detected within communications between a service and a user, would cause a communication suppression flag to be assigned to a data structure of a user account associated with a user. The trigger may include a list of predefined words, phrases, expressions, and the like. For example, the list of predefined words, phrases, and expressions may be those associated with various user states, such as happiness, sadness, anger, etc. Each trigger may be classified as being related to one or more classes of user state, as well as, or alternatively, one or more polarities (e.g., positive, negative, neutral).

In some embodiments, trigger generation subsystem 118 may generate triggers based on communications of users with a service. In particular, the triggers may be generated using a subset of communications that, subsequent to occurring, caused a communication suppression flag to be assigned to a corresponding user account. Those communications may be analyzed to determine common words, phrases, and expressions that may have caused, or resulted in, the communication suppression flag from being assigned. For example, if a particular word is detected within the subset of communications more than a threshold number of times, then the trigger may be added to the triggers stored in trigger database 136.

In some embodiments, trigger generation subsystem 118 may employ a machine learning model to learn triggers from the subset of communications, and may store the triggers in trigger database 136. Trigger generation subsystem 118 may continuously look for trends for certain words or phrases in communications in conjunction with data associated with user accounts (e.g., the user accounts associated with hose communications). For example, communications from individuals associated with user accounts that have an outstanding balance, have had a missed submission, have penalties associated with the account, and the like, may be analyzed to identify certain trending keywords, key phrases, topics, sentiments, etc. If certain words or phrases are detected over a certain period of time indicating a relationship between that word or phrase being uttered and that sentiment occurring, then those words or phrases may be added to the list of triggers stored in trigger database 136, or may be stored as candidate triggers and analyzed using additional techniques. For instance, similarities between the words and phrases detected to other words or phrases already stored in trigger database 136 may be computed and if the similarity score is greater than a similarity threshold, then those words or phrases may be added to the list of triggers. As an example, semantically similar words, lexically similar words, and the like, may be identified, and similarities between candidate triggers and stored triggers may be computed (e.g., Cosine similarity, Jaccard similarity, LSI, LDA, BERT embeddings, etc.). In some embodiments, a Bag of Words model or a Word2Vec model may be used. In some embodiments, trigger generation subsystem 118 may be configured to continually identify and update the list of triggers stored therein by detecting new words or phrases that are similar to a newly detected word or phrase. For example, if a new word is identified from analyzing communications of users, and that new word is added to the list of triggers in trigger database 136, trigger generation subsystem 118 may then identify words and phrases that are similar to the new word. These similar words and phrases may be analyzed to determine how similar they are semantically and lexically to the new word. If the similarity is determined to be strong enough (e.g., a Cosine distance less than a threshold distance), then the similar words or phrases may also be added to the list of triggers.

Using machine learning models, traditional data analytical techniques, or other techniques, or combinations thereof, trigger generation subsystem 118 may determine whether to add particular words or phrases to the list of triggers stored in trigger database 136. In some embodiments, a business intent owner (e.g., an author, reviewer, approver) may be used to determine whether to add a word or phrase to the list of triggers stored in trigger database 136. In some embodiments, trigger database 136 includes a key-value pair database (e.g., a relational database), and generates data visualizations of the various triggers stored therein. When a new word or phrase is added (or removed) from trigger database 136, the key-value pair is subsequently updated and the changes can be populated to other triggers stored in trigger database 136 that are, or are determined as being, related.

Example Flowcharts

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 6:
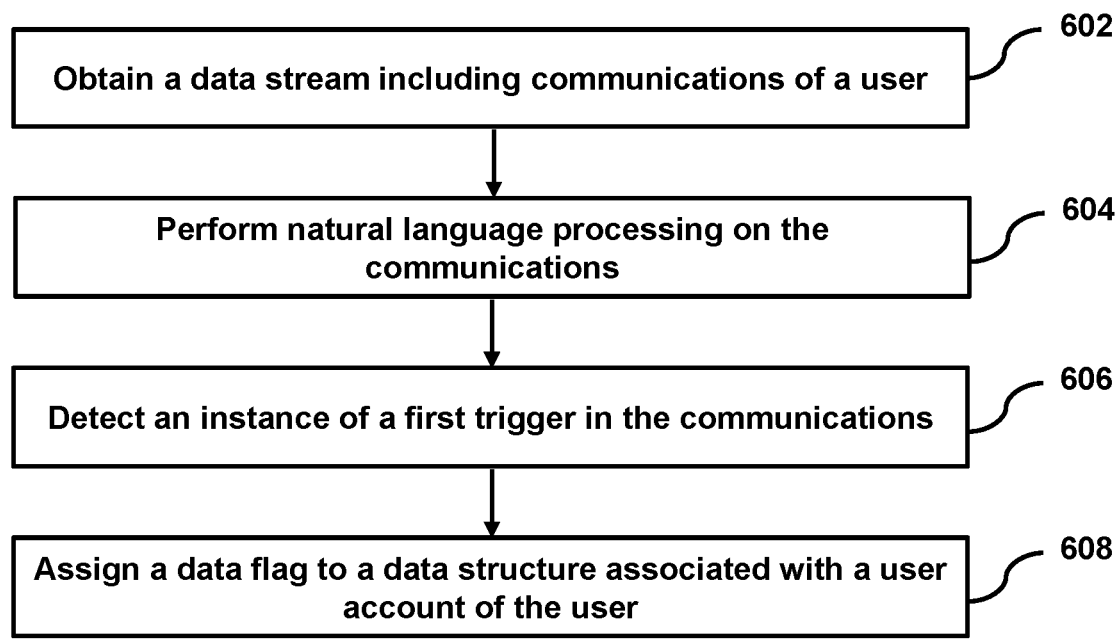
FIG. 6 shows flowchart of a method for assigning a data flag to a data structure associated with a user account, in accordance with one or more embodiments.
Figure 7:
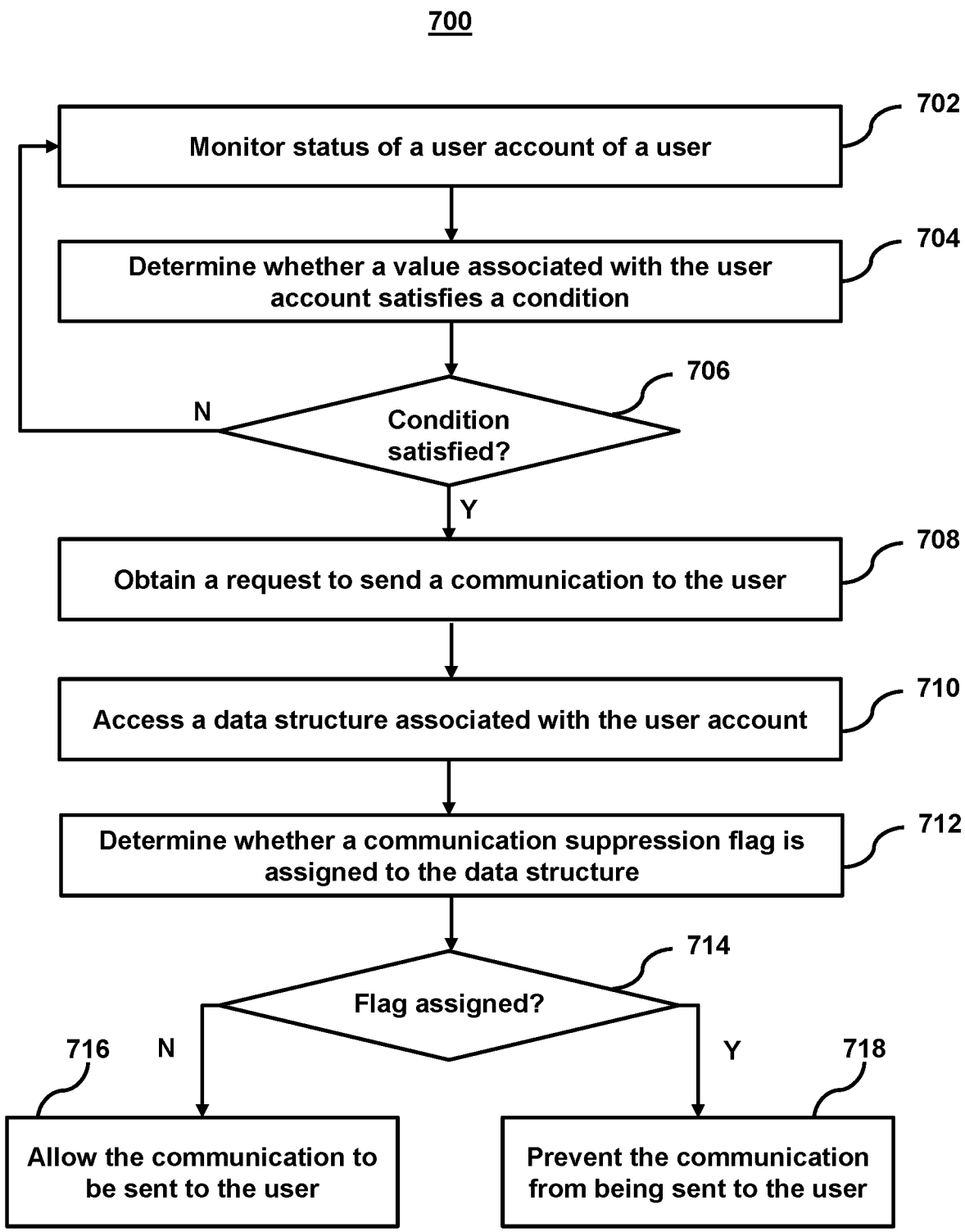
FIG. 7 shows a flowchart of a method for determining whether to send a communication to a user, in accordance with one or more embodiments.
Figure 8:
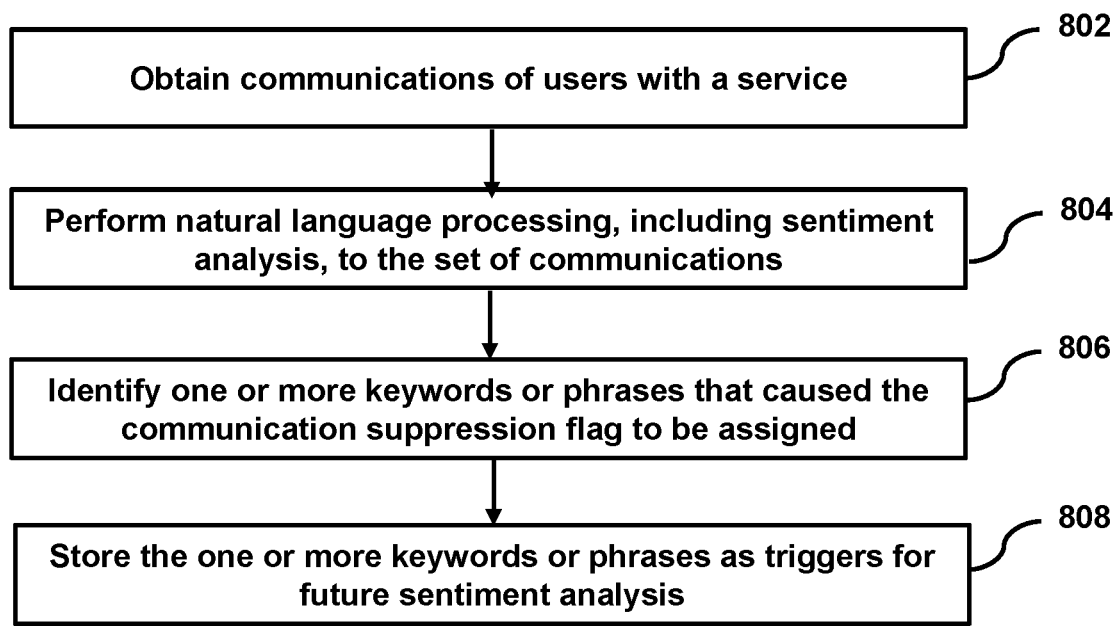
FIG. 8 shows a flowchart of a method for generating or updating a trigger database, in accordance with one or more embodiments.

FIGS. 6-8 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

FIG. 6 shows flowchart of a method 600 for assigning a data flag to a data structure associated with a user account, in accordance with one or more embodiments. In an operation 602, a data stream including communications of a user may be obtained. The communications may be between the user and a service. For example, the communications may be between a user operating client device 104 and a data stream associated with a service (e.g., a financial service, a medical service, etc.). The communications may be stored in communications database 132, and may include an identifier for each communication of the user with the service, a time with which that communication occurred, and other information associated with the communications. In some embodiments, operation 602 may be performed by a subsystem that is the same or similar to NLP subsystem 112.

In an operation 604, natural language processing may be performed to the communications. In some embodiments, the natural language processing, or NLP, may include speech-to-text processing, communication segmentation, communication parser, natural language understanding, sentiment analysis, and other processes. For example, the communications may be segmented into each individual communication, and those communications may be parsed to identify each utterance included within each communication. The text data representing the utterances of each communication may also be generated. After the text data of each utterance is obtained, NLU processing, including sentiment analysis, may be performed to the text data to identify polarities of the utterances and a state vector representing a state of the user. In some embodiments, operation 604 may be performed by a subsystem that is the same or similar to NLP subsystem 112.

In an operation 606, an instance of a trigger may be detected in the communications. For example, a determination may be made as to whether any triggers stored in trigger database 136 were uttered within any of the communications. In some embodiments, instances of a trigger may further include detection of facial expressions, gestures, and the like within a communication, which may include images, video, or other formats. In some embodiments, a trigger identifier may be generated in response to a particular trigger being detected within an utterance. In some embodiments, operation 606 may be performed by a subsystem that is the same or similar to NLP subsystem 112.

In an operation 608, a data flag may be assigned to a data structure associated with a user account of the user. The data flag may be a communication suppression flag indicating that communication from the service to the user is to be prevented. In some embodiments, a value of a data field may be updated to reflect the assignment of the communication suppression flag. When a request is received to send a communication to a user, the user account may be accessed by computer system 102, and if the communication suppression flag is determined to be assigned to the data structure associated with the user account, then the communication may be prevented from being sent to the user. In some embodiments, operation 608 is performed by a subsystem that is the same or similar to flag assignment subsystem 114.

FIG. 7 shows a flowchart of a method 700 for determining whether to send a communication to a user, in accordance with one or more embodiments. In an operation 702, a status of a user account of a user may be monitored. In some embodiments, at least one user account stored in user accounts database 138 may be periodically accessed and one or more values stored in various data fields of the user account may be extracted. For example, every few hours, days, weeks, etc., a current value stored in a particular data field may be extracted from a data structure associated with a user account. In some embodiments, operation 702 may be performed by a subsystem that is the same or similar to communication blocking subsystem 116.

In an operation 704, a determination is made as to whether a value associated with the user account satisfies a condition. In some embodiments, the condition may be that the value of a data field is less than or greater than a threshold value for more than a threshold amount of time. For example, if the extracted value corresponds to an "Amount Due," a determination may be made as to whether the "Amount Due" value is greater than a threshold amount due, and, if so, if the "Amount Due" value has been greater than the threshold amount due for more than a threshold amount of time (e.g., three months, six months, one year, etc.). In some embodiments, operation 704 may be performed by a subsystem that is the same or similar to communication blocking subsystem 116.

In an operation 706, a determination is made as to whether the condition has been satisfied at operation 704. If not, method 700 may return to operation 702 where the status of the user account, or the status of other user accounts is monitored. However, if at operation 706 it is determined that the condition has been satisfied, then method 700 may proceed to operation 708. In some embodiments, operation 706 may be performed by a subsystem that is the same or similar to communication blocking subsystem 116.

In an operation 708, a request to send a communication to a user may be obtained. The request may be obtained by computer system 102 from a service, such as the service associated with service data feed 140. In some embodiments, the request may indicate a topic with which the communication relates. For instance, the request may indicate that the communication relates (e.g., is being sent in response to) one of the values stored in a data field of a data structure associated with the user account satisfying the condition. Furthermore, the request may specify a user with whom the communication is associated. In some embodiments, the request may further indicate when the communication is to be sent to a user. In some embodiments, operation 708 may be performed by a subsystem that is the same or similar to communication blocking subsystem 116.

In an operation 710, a data structure associated with the specified user's account may be accessed. In some embodiments, the request may include a user identifier indicating the user with whom the communication is to be sent. Based on the user identifier, the corresponding user account stored in user accounts database 138 may be accessed. In particular, a data structure, such as data structure 500 or 550, may be accessed. In some embodiments, operation 710 may be performed by a subsystem that is the same or similar to communication blocking subsystem 116.

In an operation 712, a determination may be made as to whether a communication suppression flag is currently assigned to the accessed user account. In some embodiments, upon accessing the user account in user accounts database 138, computer system 102 may identify a data field associated with the communication suppression flag in a data structure of the user account. A value stored in the data field may be extracted and a determination of whether the value indicates the communication suppression flag is currently assigned to the user account may be performed. For example, the value "1" may be extracted from data structure 500, indicating that currently the communication suppression flag is assigned to the user account associated with data structure 500. In some embodiments, operation 712 may be performed by a subsystem that is the same or similar to communication blocking subsystem 116.

In an operation 714, a determination as to whether the communication suppression flag is assigned to the corresponding user account is performed. If, at operation 714, it is determined that the communication suppression flag is not assigned to the user account, method 700 may proceed to an operation 716. However, if at operation 714 it is determined that the communication suppression flag is assigned to the user account, method 700 may proceed to an operation 716.

In some embodiments, operation 714 may be performed by a subsystem that is the same or similar to communication blocking subsystem 116.

In operation 716, the communication may be allowed to be sent to the user. For instance, because the communication suppression flag is not currently assigned to the user account, communications from the service to the user are not to be suppressed. Therefore, the communication specified in the request may be sent to the user. In some embodiments, operation 716 may be performed by a subsystem that is the same or similar to communication blocking subsystem 116.

In operation 718, the communication may be prevented from being sent to the user. For instance, because the communication suppression flag is currently assigned to the user account, communications from the service are prevented from being sent to the user. By not sending communications to the user when the communication suppression flag is assigned to the user account, computer system 102 decreases the amount of network traffic across network 150 by preventing communications that are unwanted by the user from ever being sent or ever being generated. Furthermore, typically the communication suppression flag is assigned to user accounts based on detection of certain emotional characteristics of a user or life events occurring to the user or members of the users family. By preventing communications from the service from being sent to the user during such times, additional stress, pressure, grief, or negative sentiment towards the service can be alleviated. This can further improve the user's sentiment towards the service because the user will not be inundated with communications relating to a particular condition (e.g., a value of a user account being greater than a threshold amount). In some embodiments, operation 718 may be performed by a subsystem that is the same or similar to communication blocking subsystem 116.

FIG. 8 shows a flowchart of a method 800 for generating or updating a trigger database, in accordance with one or more embodiments. In an operation 802, communications of one or more users with a service may be obtained. The communications may include a set of communications stored in communications database 132. In some embodiments, each of the communications included in the set of communications may have had a communication suppression flag assigned to a corresponding user account subsequent to the communication occurring. For example, a representative of the service (e.g., a service agent) may have manually caused a communication suppression flag to be assigned to a user account during or after communicating with a corresponding user. The contents of that communication (e.g., text, images, video, audio, etc.) may be stored in communications database 132. In some embodiments, such communications may be marked for later review such that computer system 102 is able to identify these communications as being part of the set of communications. In some embodiments, operation 802 may be performed by a subsystem that is the same or similar to trigger generation subsystem 118.

In an operation 804, natural language processing, including sentiment analysis, may be performed to the set of communications. In some embodiments, each communication in the set of communications may be segmented, and the utterances included within those communications may be parsed. The list of utterances in each communication may then have STT processing 204 performed to generate text data representing each utterance. In some embodiments, sentiment analysis processing 212 may be performed to the text data to determine a polarity of each utterance. For example, a determination may be made as to whether an utterance is positive, negative, or neutral. In some embodiments, words, phrases, and other features of the utterances may be analyzed to identify common traits between the utterances which could have caused the communication suppression flag to be assigned to the user account. In some embodiments, operation 804 may be performed by a subsystem that is the same or similar to trigger generation subsystem 118.

In an operation 806, one or more keywords or phrases that caused the communication suppression flag to be assigned may be identified. For example, a determination may be made that a particular word was included within a number of utterances from different users that each had the communication suppression flag assigned to a corresponding user account. In some embodiments, if a particular word or phrase is determined to have occurred within a threshold number of different users, a threshold number of times, or other criteria, then that word or phrase may be identified as a candidate sentiment trigger. Candidate sentiment triggers may initially be flagged as being possible sentiment triggers, and may be added to the triggers stored in trigger database 136 upon determining that those candidate triggers are true triggers and not false positives. This may include manual review of the candidate triggers, determination that the triggers occur more than a threshold number of times, where uttered by a threshold number of users within a particular period of time (e.g., within a few hours or days), or other criteria. In some embodiments, operation 806 may be performed by a subsystem that is the same or similar to trigger generation subsystem 118.

In an operation 808, the keywords or phrases may be stored as triggers for use when performing sentiment analysis processing of future communications. For example, the keywords or phrases may be added to the list of keywords or phrases stored as sentiment triggers in trigger database 136. In some embodiments, each newly added trigger may be associated with a particular period of time with which the communication suppression flag is to be assigned. However, alternatively, the period of time may be added at a later point. In some embodiments, operation 808 may be performed by a subsystem that is the same or similar to trigger generation subsystem 118.

In some embodiments, the various computers and subsystems illustrated in FIG. 1 may include one or more computing devices that are programmed to perform the functions described herein. The computing devices may include one or more electronic storages (e.g., database(s) 130, which may include communications database(s) 132, model database(s) 134, trigger database(s) 136, user accounts database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although example embodiments have been described in detail for the purpose of illustration, it is to be understood that such detail is solely for that purpose and that embodiments are not limited to the disclosed embodiments, but, on the contrary, are intended to cover modifications and equivalent arrangements that are within the scope of the appended claims. For example, it is to be understood that embodiments contemplate that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "comprise," "comprising," "comprises," "include", "including", and "includes" and the like mean including, but not limited to. As used throughout this application, the singular forms "a," "an," and "the" include plural referents unless the context clearly indicates otherwise, and notwithstanding the use of other terms and phrases for one or more elements, such as "one or more." The term "or" is non-exclusive (i.e., encompassing both "and" and "or"), unless the context clearly indicates otherwise. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every.

Additional example embodiments are provided with reference to the following enumerated embodiments:

1. A method comprising: obtaining communications of a user associated with a user account of a service; detecting, using natural language processing, an instance of a first trigger in the communications; assigning, based on the first trigger, a data flag to a data structure associated with the user account; subsequent to the data flag being assigned to the data structure associated with the user account, detecting that a value associated with the user account satisfies a first condition; obtaining a request for a communication to be sent to the user based on the first condition being satisfied; and preventing, based on the data flag and the request, the communication from being sent to the user.

2. The method of embodiment 1, wherein obtaining the communications comprises obtaining a data stream comprising the communications.

3. The method of embodiment 2, wherein the data steam is from a service data feed of the service.

4. The method of any of embodiments 1-3, wherein the natural language processing comprises at least one of speech-to-text processing, communication segmentation, communication parsing, natural language understanding, or sentiment analysis processing.

5. The method of embodiment 4, wherein the sentiment analysis processing comprises at least one of trigger detection, facial expression recognition, or gesture recognition.

6. The method of any one of embodiments 1-5, wherein the natural language processing of the communications is configured to detect whether the communications include an instance of any of a plurality of triggers.

7. The method of embodiment 6, wherein the plurality of triggers are stored in a trigger database, and at least some of the plurality of triggers are associated with a period of time with which the data flag is to be assigned to the data structure associated with the user account.

8. The method of any one of embodiments 1-7, wherein the first condition being satisfied comprises the value being greater than a threshold value for more than a predefined period of time.

9. The method of any one of embodiments 1-8, further comprising: accessing the data structure associated with the user account responsive to the request being received; and determining, based on the request, that the data flag is assigned to the data structure associated with the user account, wherein the communication is prevented from being sent to the user based on the data flag being determined to be assigned to the data structure associated with the user account.

10. The method of embodiment 9, further comprising: extracting the value from a data field of the data structure, wherein the condition being satisfied is detected based on the extracted value.

11. The method of any one of embodiments 1-10, wherein performing the natural language processing of the communications comprises: performing sentiment analysis processing on the communications to determine a state of the user; and determining, based on the state of the user, that the data flag is to be assigned to the data structure.

12. The method of embodiment 11, wherein the state of the user is determined based on a state vector comprising a plurality of attributes each having a value indicating a likelihood that the user is in respective one of a plurality of states.

13. The method of embodiment 11, wherein performing the sentiment analysis comprises: identifying one or more terms in the communications; classifying the one or more terms as being related to a positive sentiment or a negative sentiment; and determining the state of the user based on the classification.

14. The method of embodiment 13, wherein the one or more terms are classified as being related to one of positive sentiment, negative sentiment, or neutral sentiment.

15. The method of any one of embodiments 1-14, wherein the first trigger indicates that the data flag is to be assigned to the data structure associated with the user account for a first period of time.

16. The method of embodiment 15, wherein the first trigger comprises a word, words, a phrase, a facial expression, a gesture, a pose, or a tone of the user.

17. The method of any one of embodiments 1-16, further comprising: obtaining, subsequent to the data flag being assigned to the data structure associated with the user account, the data stream comprising additional communications with the user; detecting, using the natural language processing, an instance of a second trigger in the additional communications; and removing the data flag from being assigned to the data structure associated with the user account based on the second trigger being detected.

18. The method of embodiment 17, wherein removing the data flag from being assigned to the data structure comprises: updating a value associated with a data field for the data flag from a first value to a second value, wherein the first value indicates that communications from the service to the user are to be prevent, and the second value indicates that communications from the service to the user are not to be prevented.

19. The method of any one of embodiments 1-18, further comprising: generating, based on prior communications of other users with the service, a plurality of triggers that, if detected in communications between a given user and the service, cause the data flag to be assigned to a given data structure associated with a given user account of the given user, wherein the first trigger is one of the plurality of triggers.

20. The method of any one of embodiments 1-19, wherein the first trigger comprises a non-verbal sound.

21. One or more tangible, non-transitory, machine-readable media storing instructions that, when executed by one or more processors, effectuate operations comprising those of any of embodiments 1-20.

22. A system comprising: one or more processors; and memory storing computer program instructions that, when executed by the one or more processors, cause the one or more processors to effectuate operations comprising those of any of embodiments 1-20.

What is claimed is:

1. A method implemented by one or more processors that, in response to executing computer program instructions, perform the method, the method comprising:

obtaining, communications with a user associated with a user account of a service;

detecting, using natural language processing, an instance of a first trigger associated with a first suppression period or a second trigger associated with a second suppression period within the communications;

assigning, based on the first trigger or the second trigger, a data flag to the user account for a suppression period equal to the first suppression period or the second suppression period, respectively;

obtaining, during the suppression period, a request for a communication to be initiated with the user, the request being obtained responsive to an amount associated with the user account satisfying a first condition; and preventing, based on the data flag and the request, the communication from being initiated with the user.

2. The method of claim 1, further comprising:

accessing the user account responsive to the request being received; and determining, based on the request, that the data flag is assigned to the user account, wherein the communication is prevented from being initiated with the user based on the data flag being determined to be assigned to the user account.

3. The method of claim 1, wherein performing the natural language processing comprises:

performing sentiment analysis on the communications to determine a state of the user; and determining, based on the state of the user, that the data flag is to be assigned to the user account.

4. The method of claim 3, wherein performing the sentiment analysis comprises:

identifying one or more terms in the communications;

classifying the one or more terms as being related to a positive sentiment or a negative sentiment; and determining the state of the user based on the classification.

5. The method of claim 1, further comprising:

obtaining, subsequent to the data flag being assigned to the user account, additional communications from the user with the service;

detecting, using the natural language processing, an instance of a third trigger within the additional communications; and removing the data flag from being assigned to the user account based on the third trigger being detected.

6. The method of claim 1, further comprising:

generating, based on prior communications of other users with the service, a plurality of triggers that, if detected in communications between a given user and the service, cause the data flag to be assigned to a given user account of the user, wherein the first trigger is one of the plurality of triggers.

7. A system for reducing network traffic by minimizing communications to client devices associated with user accounts with temporary communication suppression flags, the system comprising:

memory storing computer program instructions; and one or more processors that, when executing the computer program instructions, effectuate operations comprising:

obtaining, via a service data feed associated with a service, a data stream comprising communications with a user associated with a user account of the service;

detecting, based on natural language processing on the communications, a sentiment trigger of a plurality of sentiment triggers, the plurality of sentiment triggers comprising a first sentiment trigger associated with a first suppression time period and a second sentiment trigger associated with a second suppression time period different from the first suppression time period;

assigning, based on the detected sentiment trigger, a communication suppression flag to the user account for a suppression time period such that:
  (i) responsive to the detected sentiment trigger being the first sentiment trigger, the communication suppression flag is configured to suppress future communications from the service to the user account for the first suppression time period as the suppression time period;
  (ii) responsive to the detected sentiment trigger being the second sentiment trigger, the communication suppression flag is configured to suppress future communications from the service to the user account for the second suppression time period as the suppression time period;

obtaining, during the suppression time period, a request to initiate a communication to the user responsive to an amount due associated with the user account being greater than a threshold amount for more than a predefined period of time; and responsive to determining that the communication suppression flag is assigned to the user account, preventing the communication from being initiated with the user.

8. The system of claim 7, wherein performing natural language processing on the communications further comprises:
  classifying terms in the communications as being related to positive sentiment or negative sentiment; and
  determining, based on the classification, that the user is in a first state, wherein the communication suppression flag is assigned to the user account based on the user of the communications being determined to be in the first state.

9. The system of claim 7, wherein after the suppression time period ends, the communication suppression flag is removed from the user account.

10. The system of claim 7, where the plurality of sentiment triggers further comprises a third sentiment trigger; and wherein the operations further comprise:
  obtaining, via the service data feed, subsequent to the communication suppression flag being assigned to the user account, the data stream comprising additional communications from the user with the service;
  detecting, based on natural language processing on the additional communications, the third sentiment trigger; and
  causing, based on the third sentiment trigger, the communication suppression flag to be removed from the user account.

11. A non-transitory, computer-readable medium storing computer program instructions that, when executed by one or more processors, effectuate operations comprising:
  obtaining a data stream comprising communications with a user associated with a user account of a service;
  detecting, using natural language processing, a trigger of a plurality of triggers in the communications, the plurality of triggers comprising a first trigger associated with a first suppression period and a second trigger associated with a second suppression period;
  assigning, based on the detected trigger, a data flag to the user account for a suppression period such that:
    (i) responsive to the detected trigger being the first trigger, the data flag is configured to suppress future communications from the service to the user account for the first suppression period as the suppression period;
    (ii) responsive the detected trigger being the second trigger, the data flag is configured to suppress future communications from the service to the user account for the second suppression period as the suppression period;
  detecting that an account balance associated with the user account satisfies a first condition;
  obtaining, during the suppression period, a request for a communication to be initiated with the user based on the first condition being satisfied; and
  preventing, based on the data flag and the request, the communication from being initiated with the user.

12. The non-transitory, computer-readable medium of claim 11, wherein the first condition being satisfied comprises the account balance being greater than a threshold amount for more than a predefined period of time.

13. The non-transitory, computer-readable medium of claim 11, wherein the operations further comprise:
  accessing the user account responsive to the request being received; and
  determining, based on the request, that the data flag is assigned to the user account, wherein the communication is prevented from being initiated with the user based on the data flag.

14. The non-transitory, computer-readable medium of claim 11, wherein performing the natural language processing of the communications comprises:
  performing sentiment analysis on the communications to determine a state of the user; and
  determining, based on the state of the user, that the data flag is to be assigned to the user account.

15. The non-transitory, computer-readable medium of claim 14, wherein performing the sentiment analysis comprises:
  identifying one or more terms in the communications;
  classifying the one or more terms as being related to a positive sentiment or a negative sentiment; and
  determining the state of the user based on the classification.

16. The non-transitory, computer-readable medium of claim 11, wherein the trigger indicates that the data flag is to be removed from the user account after the suppression period.

17. The non-transitory, computer-readable medium of claim 11, wherein the operations further comprise:
  obtaining, subsequent to the data flag being assigned to the user account, the data stream comprising additional communications with the user;
  detecting, using the natural language processing, an instance of a third trigger in the additional communications; and
  removing the data flag from being assigned to the user account based on the third trigger being detected.

18. The non-transitory, computer-readable medium of claim 11, wherein the operations further comprise:
  generating, based on prior communications of other users with the service, a set of triggers that, if detected in one or more communications between a given user and the service, cause the data flag to be assigned to a given user account of the given user, wherein set of triggers comprises the plurality of triggers.

19. The non-transitory, computer-readable medium of claim 11, wherein the trigger comprises a non-verbal sound.

* * * * *